United States Patent

[11] 3,581,022

[72] Inventors Sadao Shigetomi
Sagamihara;
Shoichi Saito, Tokyo, Japan

[21] Appl. No. 774,653
[22] Filed Nov. 12, 1968
[45] Patented May 25, 1971
[73] Assignee Olympus Optical Company Limited
Tokyo, Japan
[32] Priority June 29, 1968
[33] Japan
[31] 43/54791, 43/54792, 43/54793 and
43/54794

[54] MINIATURE TAPE RECORDER
6 Claims, 23 Drawing Figs.

[52] U.S. Cl. .......... 179/100.2Z
[51] Int. Cl. .......... G11b
15/02, G11b 23/02
[50] Field of Search .......... 179/100.2
(Z), 100.2, 100.2 (MI); 274/4 (B), 4 (C), 4 (D),
11 (B), 11 (C), 11 (D)

[56] References Cited

UNITED STATES PATENTS

| | | | |
|---|---|---|---|
| 3,458,158 | 7/1969 | Omira .......... | 242/198 |
| 2,713,618 | 7/1955 | McNabb .......... | 179/100.2 |
| 2,893,737 | 7/1959 | Travis .......... | 179/100.2 |
| 2,894,700 | 7/1959 | Roberts et al. .......... | 179/100.2 |
| 2,896,945 | 7/1959 | Waldman .......... | 179/100.2 |

*Primary Examiner*—Bernard Konick
*Assistant Examiner*—Robert S. Tupper
*Attorney*—Waters, Roditi, Schwartz and Nissen

ABSTRACT: A miniature tape recorder having a flat elongated casing capable of being held in one hand of a user. A cassette mounting means is located on the front side of the casing along a longitudinal edge thereof. An operating means, including a record pushbutton, a record-reproduction pushbutton, a stop pushbutton, and a slidable tape speed control button, is mounted on the opposite longitudinal edge of the casing. A cassette knockout button is located on the back side of the casing in the proximity of the cassette mounting means, while a volume rotary knob, for actuating a volume control means, is located on the same side edge as the cassette mounting means with spacing from the knockout button.

MINIATURE TAPE RECORDER

This invention relates to a miniature tape recorder, and more particularly to a miniature tape recorder operable in the state as held in one hand of a user.

Recently, there has been an increasing demand for compact and miniature tape recorders. A miniature tape recorder, despite its limited size, should have all the mechanisms necessary for fulfilling the functions carried out by the corresponding mechanisms of a regular size tape recorder. Such mechanisms include a tape driving mechanism, an operational control mechanism, a magnetic head mechanism, amplifying circuit means, etc. In a miniature tape recorder, all such mechanisms should be assembled in an extremely small casing. The tape driving mechanism is most complicated among them, and should include a driving motor, a flywheel, a capstan, a pinch roller, a reel drive shaft on the takeup side, a reel drive shaft on the rewind side, a brake mechanism, a record-reproduction turnover mechanism, a stop mechanism, and a switch mechanism to select rewind or fast-feed mode of operation. Furthermore, in order to use a cassette holding a magnetic tape premounted thereon, a cassette mounting means should be provided. In a cassette-type tape recorder, it is preferable, from the standpoint of operation and appearance, to mount the cassette flush with the tape recorder. The cassette mounting mechanism, capable of mounting such a cassette, occupies a considerably large space of the casing, and hence, the space available for the aforesaid various mechanisms in the cassette-type tape recorder is correspondingly reduced. In order to facilitate the replacement of the cassette and turn about of the cassette from one side to the other, it is necessary to provide a release means for releasing the cassette mounting means to allow the removal of the cassette out of the casing of the recorder. Since the object of the present invention is to provide a miniature tape recorder to be handled in one hand, the aforesaid various mechanisms of the recorder should be mounted in an extremely small casing, such as a 10 cm. (length) × 6 cm. (width) × 2 cm. (thickness) rectangular box, and the space for the cassette should be included therein. Moreover, to insure reliable and simple operation of the tape recorder in one hand, a number of operating members should be disposed at accessibly operative positions. Such operating members include a record starting member, a reproduction starting member, a stopping member, a switch member to select rewind or fast-feed (or fast-forward) mode of operation, a cassette release actuator, a power source switch, and a sound-volume control member. Moreover, such operating members are sometimes required to meet special need, for instance, to be easily and reliably operable simply by touch without being seen while being kept in a pocket.

An object of the present invention is to provide a miniature tape recorder of such construction as to meet the aforesaid requirements and need.

A preferred embodiment of the miniature tape recorder, according to the present invention, comprises: a flat elongated casing to be held by one hand of an operator and having a bottom wall extending in the longitudinal direction of the casing, the width of the bottom wall being larger than the thickness of the casing taken at right angles to the bottom wall; a chassis adapted to be fitted in said casing and having a lower portion in contact with said bottom wall of the casing, a raised portion spaced from said bottom wall, and an intermediate portion interconnecting said lower and raised portions; an electric amplifier means mounted on said lower portion of the chassis and having a driving shaft extending into the space between said bottom wall and said raised portion of the chassis through said intermediate portion thereof; a flywheel pivotally mounted on said raised portion of the chassis; a capstan coaxially secured to said flywheel, a pulley pivotally mounted on said intermediate portion of the chassis so as to be driven by said motor; a rotary shaft pivotally mounted on said raised portion of the chassis and coaxially connected to said pulley in a slidable manner by a spring; three frictional wheels coaxially mounted on said rotary shaft; reel drive discs pivotally secured to the raised portion of the chassis; reel drive shafts coaxially secured to said reel drive discs; a pinch roller movably mounted on said raised portion of the chassis; a record pushbutton integrally secured to a first lever slidable on said raised portion of the chassis and having an erasing head secured thereto; a record-reproduction pushbutton secured to a second lever slidable on said raised portion of the chassis and adapted, upon depression of said record-reproduction pushbutton, to swing said motor to bring said driving shaft of the motor into operative engagement with said flywheel and to urge said pinch roller against said capstan; a recording-reproducing magnetic head secured to said second lever; a stop pushbutton secured to a stop lever slidable on said raised portion of the chassis and adapted, upon depression of said stop pushbutton, to swing back said motor to disengage said driving shaft from said flywheel and to remove said pinch roller from said capstan; and a slidable switch button selectively occupying a rewind position, a record-reproduction position, and a fast-feed position, and related to said frictional wheels for selectively effecting the magnetic tape feeding at a rewinding speed, at a recording-reproducing speed, and a fast-feeding speed, respectively, depending on the operative position of said slidable switch button, by selectively engaging one of said frictional wheels with said reel drive disc.

For a better understanding of the invention, reference is made to the accompanying drawings, in which:

FIG. 5 is a plan view of the tape recorder of

Figure 1:
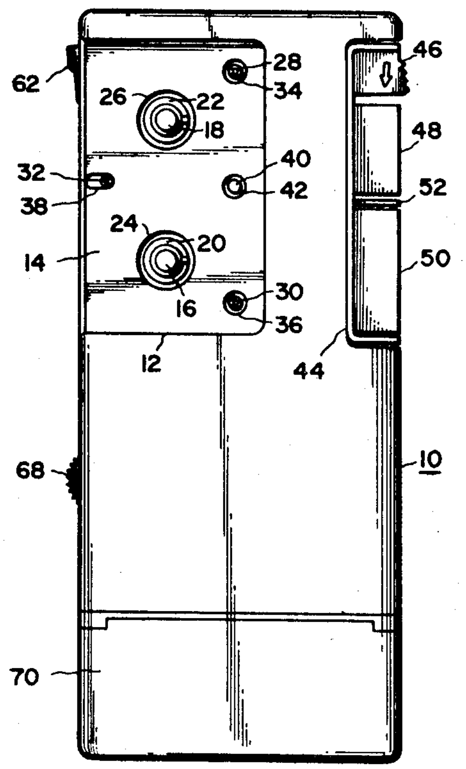
FIG. 1 is a front view of a miniature tape recorder, according to the present invention.
Figure 5:
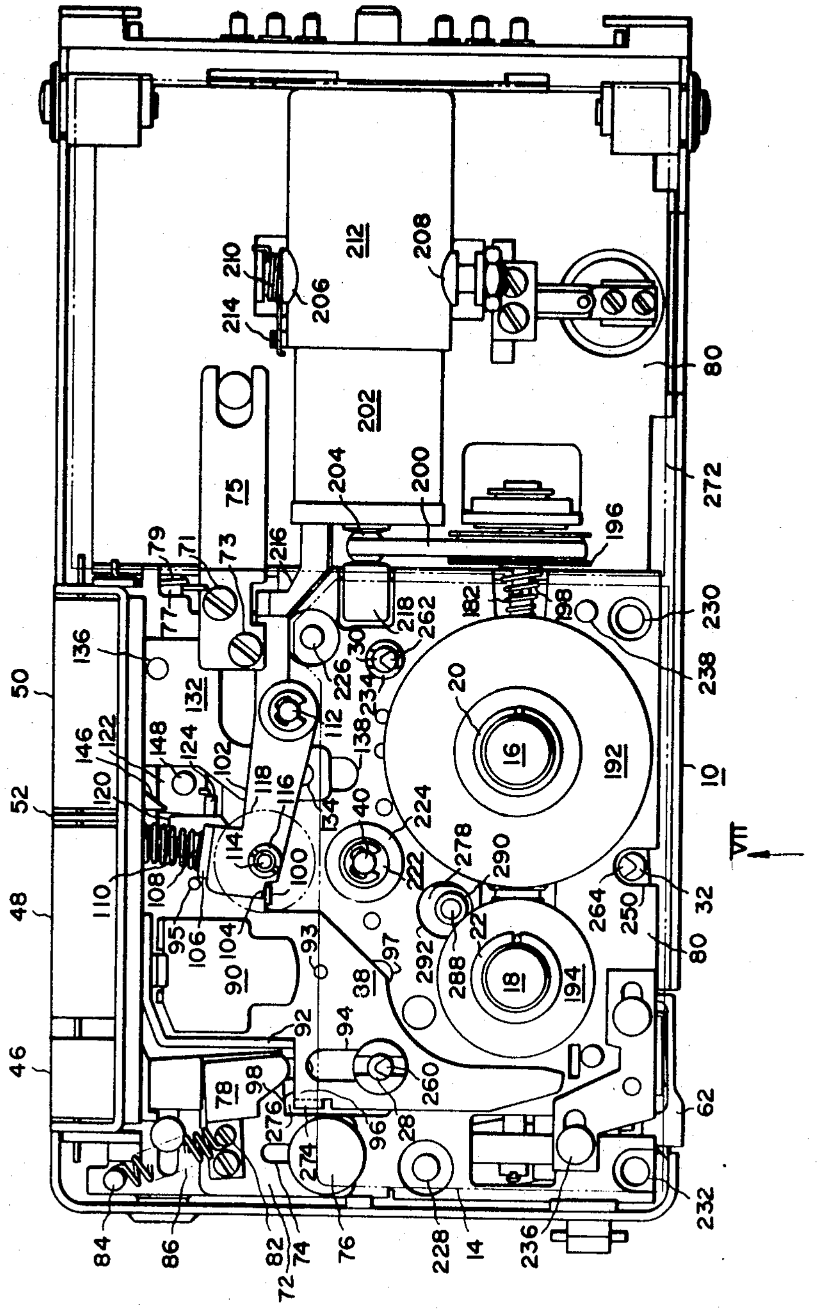
Figure 6:
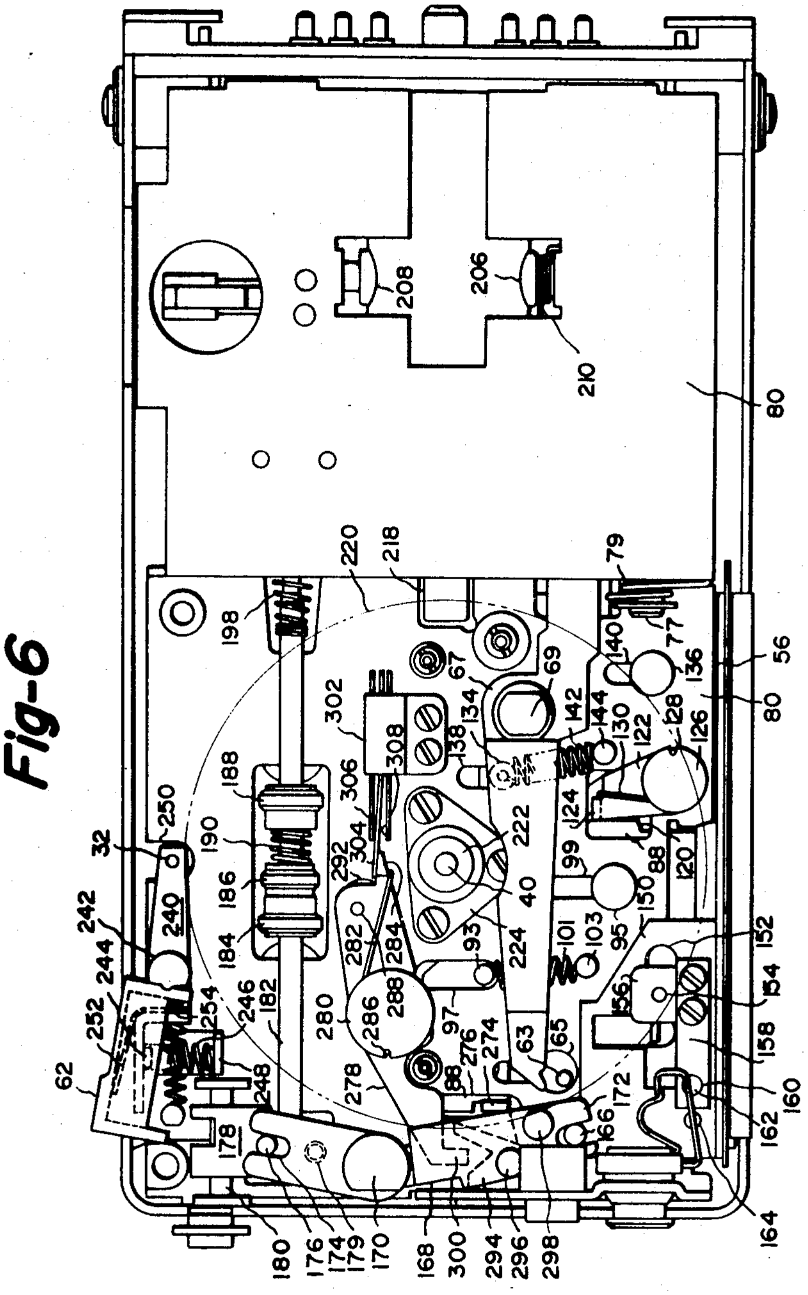
Figure 7:
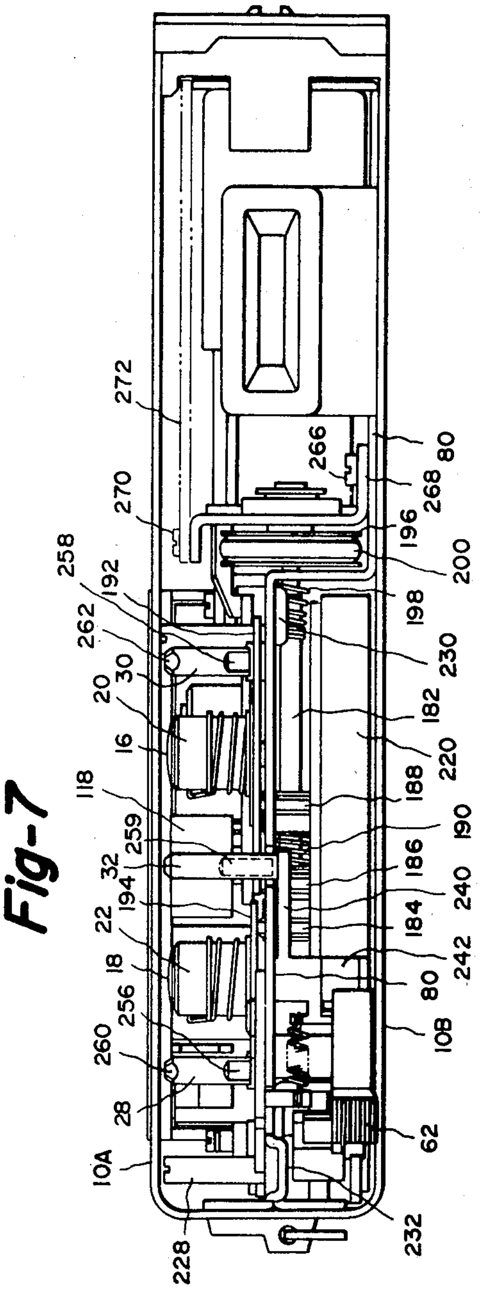
Figure 8:
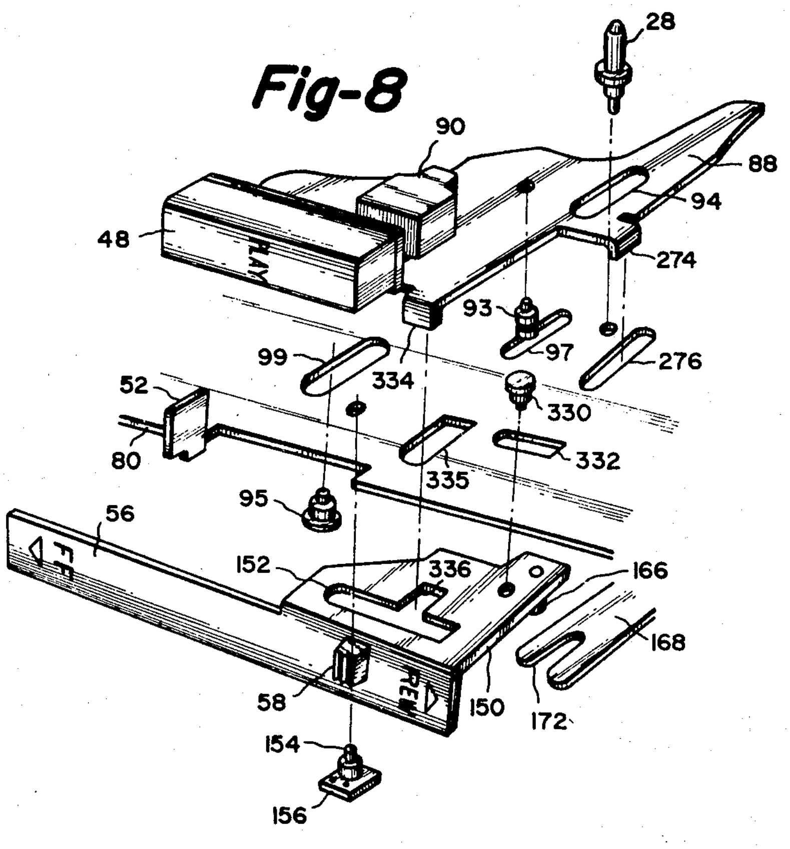
Figure 10:
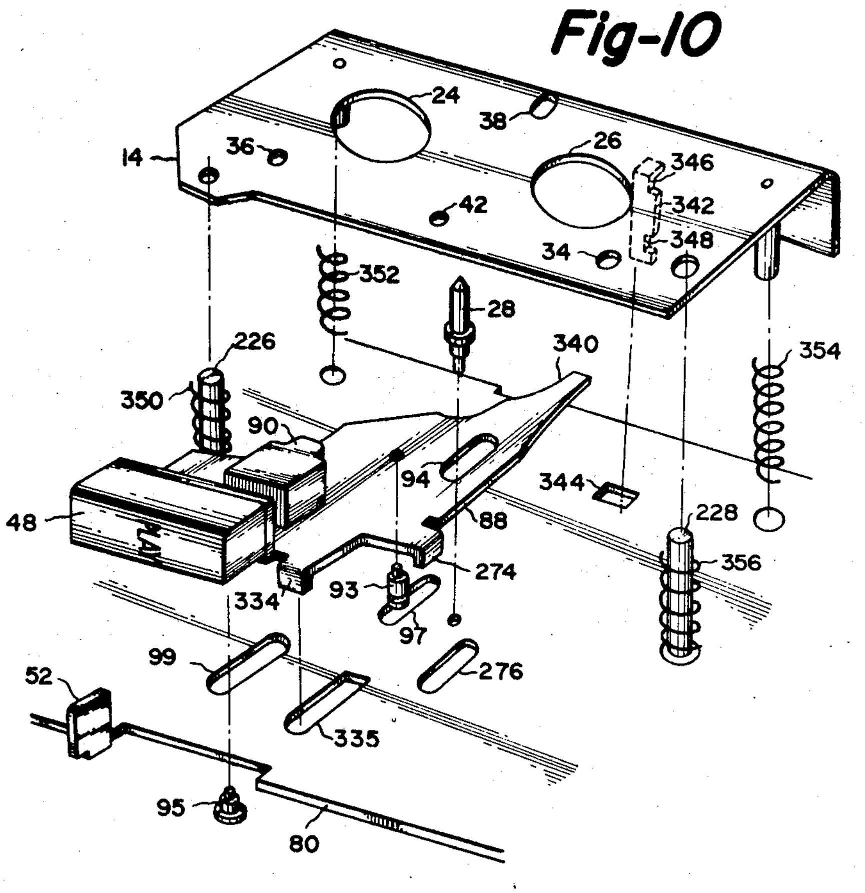
Figure 11A:
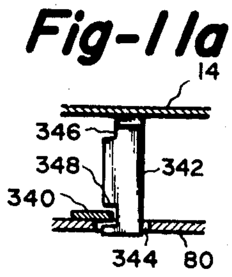
Figure 11B:
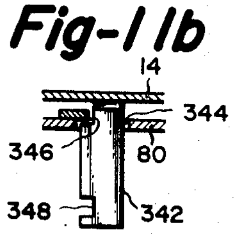
Figure 12:
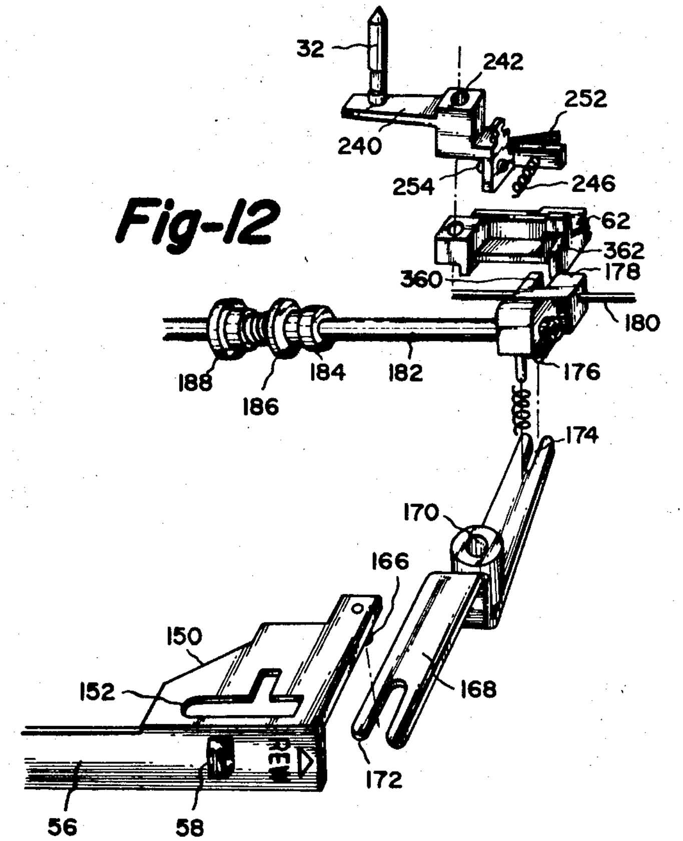
Figure 13:
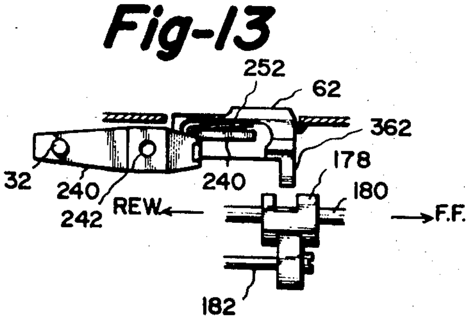
Figure 14:
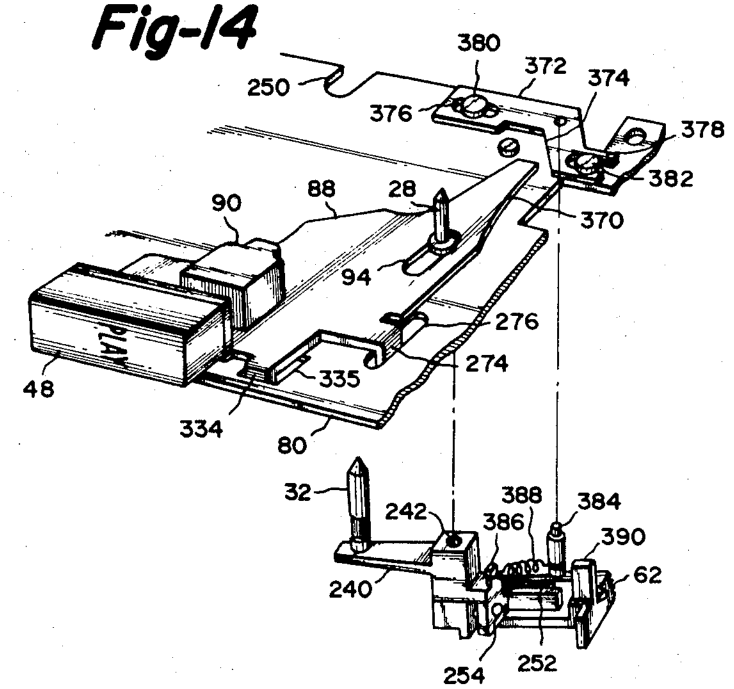
Figure 15A:
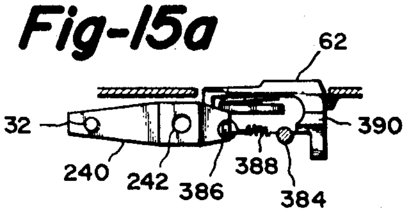
Figure 15B:
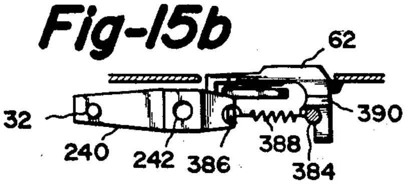
Figure 16:
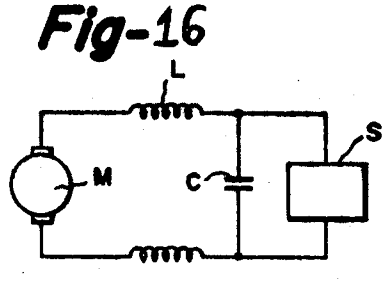
Figure 17:
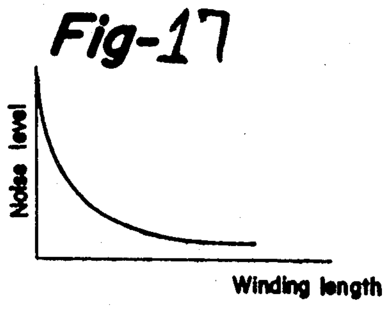
Figure 18:
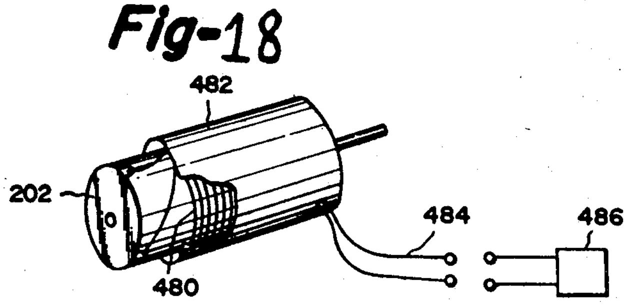

FIG. 1, illustrating the inside structure thereof, with the upper half of the casing and a cassette removed therefrom;

FIG. 6 is a plan view of the tape recorder of FIG. 1, taken from the opposite side to FIG. 5, with the lower half of the casing and a flywheel removed therefrom;

FIG. 7 is a side view, taken from the direction of the arrow VII of FIG. 5;

FIG. 8 is an exploded perspective view, illustrating a first safety device usable in the miniature tape recorder according to the present invention;

FIGS. 9*a* to 9*d* are a series of schematic views, illustrating the operation of the safety device of FIG. 8;

FIG. 10 is a exploded perspective view of a second safety device usable in the miniature tape recorder, according to the present invention;

FIGS. 11*a* and 11*b* are schematic views illustrating the operation of the safety device of FIG. 10;

FIG. 12 is an exploded perspective view of a third safety device usable in the miniature tape recorder, according to the present invention;

FIG. 13 is a front view of the essential portion of the safety device of FIG. 12;

FIG. 14 is an exploded perspective view of a fourth safety device usable in the miniature tape recorder, according to the present invention;

FIGS. 15*a* and 15*b* are front views, illustrating the operation of the safety device of FIG. 14;

FIG. 16 is an electric circuit diagram of a known noise-reducing means, usable in miniature tape recorders, for reducing electric noise caused by a DC micromotor;

FIG. 17 is a graph showing the relation between the noise caused by a DC micromotor and the length of a choke coil; and FIG. 18 is a diagrammatic illustration of a noise reducing means usable in the miniature tape recorder, according to the present invention.

Like parts are designated by like numerals and symbols throughout the drawings.

Figure 2:
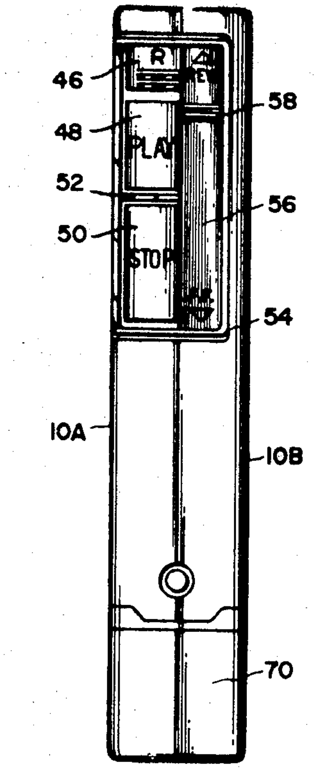
FIG. 2 is a side view of the miniature tape recorder, as seen from the right-hand side of FIG. 1.
Figure 3:
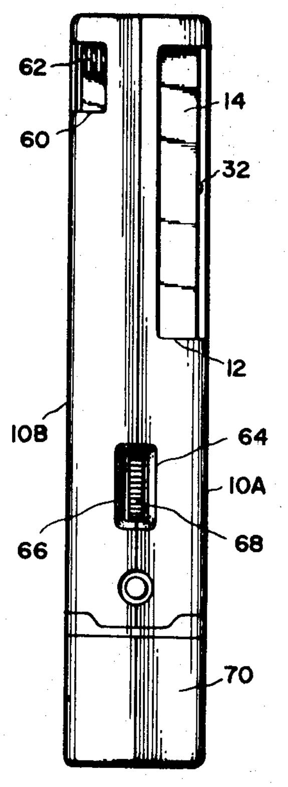
FIG. 3 is a side view of the miniature tape recorder, as seen from the left-hand side of FIG. 1.

Referring to FIG. 1, showing the front view of a miniature tape recorder, according to the present invention, a rectangular casing 10 is made of two halves; namely an upper half 10A and a lower half 10B, as best shown in FIGS. 2 and 3. As shown in FIG. 1, there is formed an opening 12 at the upper left corner of the upper half 10A of the casing 10 for receiving a cassette. The opening 12 is slightly larger than the cassette in dimension. As seen in FIG. 3, the opening 12 extends to a side edge of the upper half 10A of the casing 10. The depth of the opening 12, as best shown in FIG. 3, is about the same as the thickness of the cassette, so that when the cassette is properly mounted on the miniature tape recorder, the upper surface of the cassette will be flush with the upper surface of the casing 10. Thus, the cassette does not extend out of the casing 10, when it is correctly mounted thereon. A cassette receiving plate 14 is fitted at the bottom of the opening 12, and springs are inserted underneath the cassette receiving plate 14 to bias the receiving plate 14 upwards. The cassette receiving plate 14 has a pair of shaft holes 24, 26 and three pin holes 34, 36, 38; so that a pair of reel drive shafts 20, 22, rotatably mounted on a pair of stationary shafts 16, 18, penetrate through the shaft holes 24, 26, respectively, and three pins 28, 30, 32, for guiding the movement of the cassette receiving plate 14 and holding the cassette at the lowered position, penetrate through the pin holes 34, 36, 38, respectively. The pin hole 38 is elongated to form a slotlike opening. In addition, a capstan hole 42 is formed on the cassette receiving plate 14 to allow a capstan 40 to penetrate therethrough. The details of the reel drive shafts, the pins, and the capstan will be described hereinafter referring to a cassette holding mechanism.

An elongated opening 44 is formed on the upper half 10A of the casing 10 on the opposite side of the cassette receiving opening 12. This elongated opening 44 extends across the full depth of the casing 10, as shown in FIG. 2. Three pushbuttons 46, 48, 50 are so disposed as to be accessible through the elongated opening 44 and in alignment with each other. As will be described hereinafter, the pushbutton 46 is connected to an erasing head made of a permanent magnet, and the pushbutton 48 is connected to a recording-reproducing magnetic head.

For the recording mode of operation, the two pushbuttons 46 and 48 are simultaneously depressed, so as to bring the erasing head and the magnetic head into contact with a magnetic tape premounted in the cassette. The pushbuttons 46 and 48 have a suitable locking means, so that upon depression thereof, the pushbuttons are held as depressed by the locking means. The pushbutton 50 is a stop button, and upon depression of the pushbutton 50, the aforesaid locking means is released to allow the return of the pushbuttons 46 and 48 to their original nondepressed positions, respectively.

For the reproducing mode of the operation, only the pushbutton 48 is depressed, to bring the magnetic head in contact with the tape.

For compactness, the length of the pushbutton 46, taken in the longitudinal direction of the elongated hole 44, is about one half of that of the pushbutton 48 or 50. The shortness of the pushbutton 46 also serves to eliminate the danger of malfunction of depressing only the pushbutton 46. For correct operation, the pushbutton 46 should always be actuated in conjunction with the pushbutton 48. In order to prevent simultaneous depression of the pushbuttons 48 and 50, a partitioning plate 52 is formed between the pushbuttons 48 and 50.

An elongated opening 54 is formed on the lower half 10B of the casing 10, so as to abut on the opening 44 of the upper half 10A, as shown in FIG. 2. The slidable switch button 56 is fitted in the elongated opening 54. A boss 58 is formed on the slidable switch button 56 to facilitate vertical reciprocation thereof by pushing the boss 58 by a finger, as seen in FIG. 2. The slidable switch button 56 has three operative positions to be occupied. The first, or the uppermost position is for actuating the rewind operation of the magnetic tape. The second, or the lowermost position is for actuating the fast-feed operation of the magnetic tape. The third position, or the intermediate position between the first and second positions, is for allowing the aforesaid recording and reproducing mode of operation. As described above, the pushbuttons 46 and 48 for recording and reproducing, the stop pushbutton 50, and the slidable switch button 56 are disposed adjacent to each other. The danger of malfunction of those pushbuttons and the slidable button is minimized by selecting the operating direction of the pushbuttons 46, 48 and 50 perpendicular to that of the slidable switch button 56.

As best shown in FIG. 3, a knockout button opening 60 is formed on the edge of the lower half 10B of the casing 10 to receive a cassette knockout pushbutton 62. Upon depression of the cassette knockout button 62, the aforesaid cassette holding mechanism is released so as to cause the cassette to spring up together with the cassette receiving plate 14 and to knockout of the cassette receiving opening 12. Thus, the replacement and turnabout of the cassette can be done very easily. To receive a rotary volume control knob 68, cooperating openings 64 and 66 are bored on the upper and lower halves 10A and 10B, respectively, as shown in FIG. 3. A power source casing 70 having a power source means, e.g. dry cells, mounted therein, is replaceably connected to the lower end of the casing 10. For the reproducing mode of operation, another casing containing a speaker is connected between the casing 10 and the power source casing 70.

Figure 4:
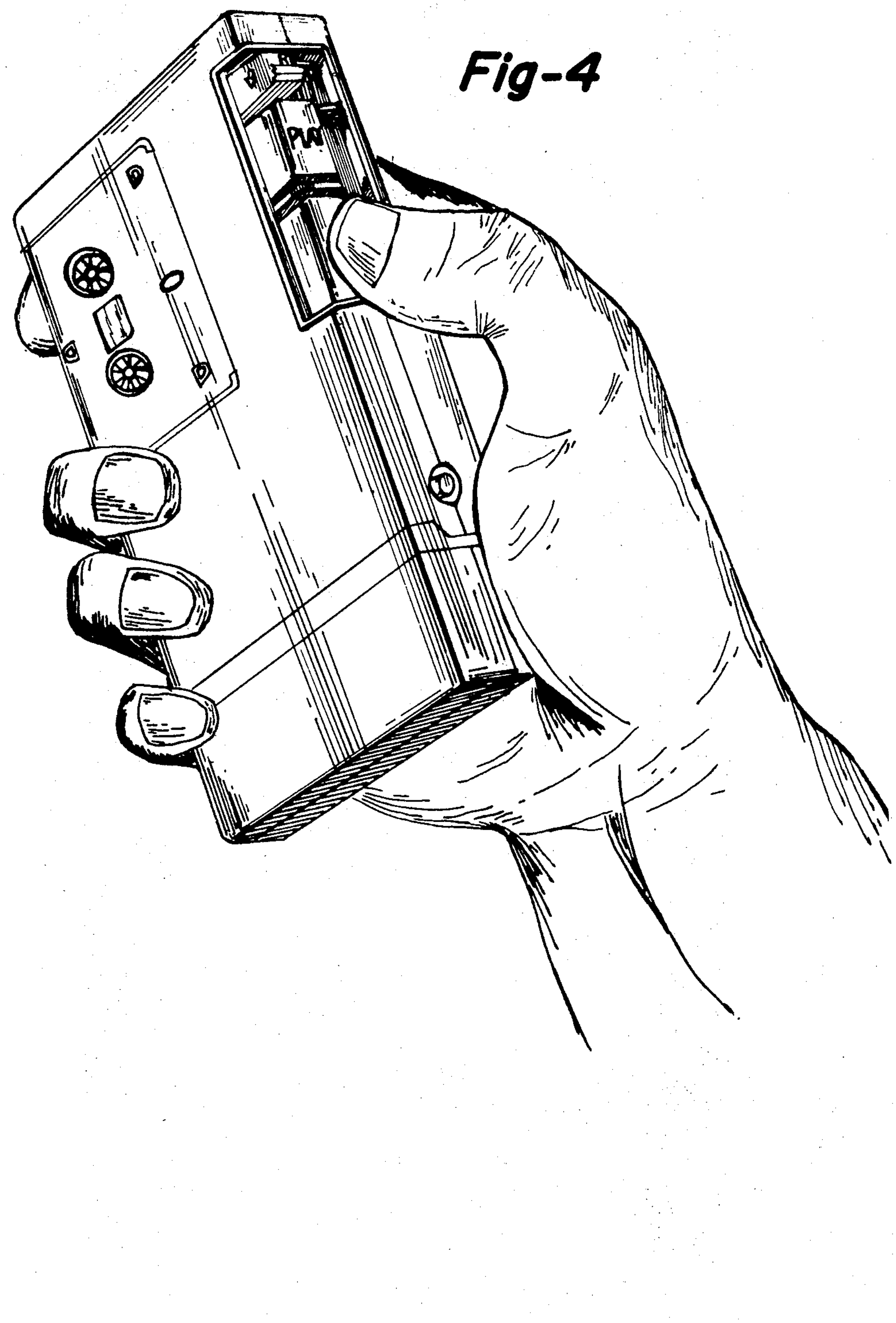
FIG. 4 is a perspective view of the tape recorder of FIG. 1, shown in the state as held by the right hand of an operator for operation therein.

FIG. 4 shows the miniature tape recorder, according to the present invention, held in the right hand of an operator. In this case, the right-hand thumb actuates the pushbuttons 46, 48, 50 for recording, reproducing, and stopping, as well as the slidable switch button 56. The right-hand index finger actuates the cassette knockout button 62, and the rotary volume knob 68 can be operated by the middle finger or the ring finger. FIG. 4 shows the recorder held in the right hand, but it is, of course, possible to hold the recorder in the left hand and to operate it by the left hand. When the tape recorder is held in the left hand, the pushbuttons 46, 48, and 50 for recording, reproducing and stopping, as well as the slidable switch button 56, can be operated by the index finger and the middle finger, or sometimes in conjunction with the ring finger. The thumb can be used for actuating the cassette knockout button 62 and the rotary volume knob 68. In either case of holding the recorder by the left hand or the right hand, the cassette is placed on the upper side of the recorder to facilitate the inspection thereof by eyesight.

FIG. 5 shows the inside structure of the miniature tape recorder, according to the present invention, with the upper half 10A of the casing 10 removed. In the figure, the position of the cassette receiving plate 14 is illustrated by dash-dot lines. A lever 72 is secured to the pushbutton 46, and an elongated slot 74 is bored on the lever 72, so that a pin 76 with a disc head extends through the slot 74 and is secured to a chassis 80. Accordingly, upon depression of the pushbutton 46, the lever 72 slides on the chassis 80 toward the inside of the tape recorder under the guidance of the pin 76. The lever 72 has an erasing head 78 made of a permanent magnet and secured to the lever 72. A pin 82 is secured to a member holding the erasing head 78, so that a pulling spring 86 is inserted between the pin 82 and another pin 84 secured to the chassis 80.

A lever 88 is integrally secured to the pushbutton 48, and a record-reproduction head 90 is secured to the lever 88. A tape guide 92 is secured to the lever 88, so as to interpose between the erasing head 78 and the record-reproduction head 90. A slot 94 is formed on the lever 88, and the aforesaid pin 28 extends through the slot 94. The pin 28 constitutes a part of the cassette holding mechanism, as will be described hereinafter. As best shown in FIG. 6, pins 93 and 95 are secured to the lever 88, which extend through slots 97 and 99 of the chassis 80, respectively. Thus, the lever 88 slides on the chassis 80 toward the inside of the tape recorder, upon depression of the pushbutton 48. Another pulling spring 101 is inserted between the pin 93 secured to the lever 88 and a pin 103 secured to the chassis 80. The pulling spring 101 acts to bias both the pushbutton 48 and the lever 88 connected thereto toward the outside of the tape recorder. A shoulder portion 96 is formed at a corner of the lever 88, and a corresponding shoulder portion is formed on the lever 72, so that for actuating the recording mode of operation of the tape recorder, the shoulder portion 96 and 98 come into contact with each other to allow the simultaneous movement of the levers 72 and 88 toward the inside of the tape recorder.

A projection 100 is formed on the lever 88 at the corner opposite to the shoulder portion 96, so that the notch 104 of a rotary lever 102 pivotally mounted on a shaft 112 secured to the chassis 80 engages the projection 100. The rotary lever 102 has a bent portion 106, and one end of a compression spring 110 is secured to the bent portion 106 by a pin 108. The opposite end of the compression spring 110 is kept in contact with that bent portion of the lever 88 where the lever 88 is secured to the pushbutton 48. A pinch roller pin 114 is secured to the free end of the rotary lever 102, and a pinch roller 118 is rotatably mounted on the top of the pinch roller pin 114 through a ball bearing 116. The notch 104 of the rotary lever 102 is always urged against the projection 100 of the lever 88 by the compression spring 110, and hence, upon depression of the pushbutton 48, the rotary lever 102 rotates around the shaft 112, while being urged against the projection 100 by the spring 110, so that the pinch roller 118 comes into operative engagement with the capstan shaft 40. When the pushbutton 48 is further depressed, the lever 88 proceeds into the inside of the tape recorder, but the rotary lever 102 does not rotate any further, because, the pinch roller 118 is in contact with the capstan 40. Accordingly, the projection 100 leaves the notch 104 of the rotary lever 102, and the lever 88 moves to the inside of the tape recorder against compression spring 110. Thus, the magnitude of the pressure urging the pinch roller 118 against the capstan 40 is determined by the elasticity of the compression spring 110 and can be kept constant thereby.

The lever 88 has another notch 120 formed at the upper left corner of the lever 88, so that upon full depression of the pushbutton 48, the projection 124 formed on a swingable lever 122 engages the notch 120 to hold the button 48 at the thus depressed position. As best seen in FIG. 6, the swingable lever 122 is pivotally supported by a shaft 126 secured to the chassis 80. A spiral spring 130 is mounted on the shaft 126, and one end of the spiral spring 130 is fastened to a notch 128 formed on the shaft 126, while the opposite end of the spiral spring 130 engages a projection 124 of the swingable lever 122, so as to bias the lever 122 toward the lever 88 by the spiral spring 130.

The stop pushbutton 50 is connected to a lever 132. The lever 132 has a pair of pins 134, 136, as shown in FIGS. 5 and 6, which are slidably fitted in slots 138, 140 formed on the chassis 80, respectively, so as to guide the movement of the lever 132 on the chassis 80 toward the inside of the tape recorder in response to the depression of the stop pushbutton 50. As shown in FIG. 6, a pulling spring 142 is inserted between the pin 134 secured to the lever 132 and another pin 144 secured to the chassis 80. Thus, both the stop pushbutton 50 and the lever 132 secured to the pushbutton are biased toward the outside of the tape recorder by the pulling force of the spring 142. A triangular claw 146 is integrally formed on the lever 132, and a pin 148 is so secured to the swingable lever 122 as to be engageable wit the triangular claw 146. As described above, upon full depression of the pushbutton 48, the swingable lever 122 moves clockwise to cause engagement of the projection 124 thereof with the notch 120 of the lever 88, so that the pushbutton 48 is locked at the thus depressed position. On the other hand, upon depression of the stop pushbutton 50, the triangular claw 146 comes into operative engagement with the pin 148 secured to the swingable lever 122, so as to cause counterclockwise rotation of the swingable lever 122, to remove the projection 124 of the swingable lever 122 from the notch 120 of the lever 88. Accordingly, the lever 88 and the pushbutton 48 return to the nondepressed original position due to the pulling force of the spring 101.

The operative mechanism relating to the slidable switch button 56 will now be described, referring to FIG. 6. A sliding lever 150 is secured to the slidable switch button 56, and a slot 152 is formed on the sliding lever 150, so that a pin 154 secured to the chassis 80 fits in the slot 152. A head plate 156 is integrally connected to the free end of the pin 154, and a plate spring or leaf spring 158 is secured to the head plate 156. A circular hole 160 is bored at the tip of the leaf spring 158, so as to hold a ball 162 fitted therein. The diameter of the circular hole 160 is made smaller than that of the ball 162, so as to prevent separation of the ball from the hole 160. In other words, the ball 162 is inserted between the leaf spring 158 and the sliding plate 150, and about one-half of the ball 162 is rotatably held by the circular hole 160, without allowing the passage of the ball 162 through the circular hole 160. In order to insure the correct positioning of the three-position slidable switch button 56, three positioning holes are bored on the sliding lever 150 so as to correspond to the three operative positions to be occupied by the slidable switch button 56. Upon the movement of the slidable switch button 56, the ball 162 rolls on the sliding lever 150 between adjacent two holes of said three-positioning holes bored on the lever 150, and as the button 56 arrives at one of the three operative positions, the ball 162 fits in the corresponding positioning hole. In FIG. 6, one of the three-positioning holes bored on the lever 150 is illustrated by the reference numeral 164. Thus, the combination of the leaf spring 158, the ball 162, and the positioning hole 164 acts as an indexing stopper for keeping the slidable button 56 always correctly at one of the three operative positions thereof.

The sliding lever 150 has a pin 166 secured at a corner thereof. A swingable lever 168 is pivotally supported by a shaft 170 secured to the chassis 80, and both the longitudinal ends of the swingable lever 168 are bifurcated. One bifurcated end 172 engages the pin 166 secured to the sliding lever 150, and the other bifurcated end 174 engages another pin 176. The pin 176 is secured to the sliding member 178 slidably carried by a stationary shaft 180. When the slidable switch button 56 moves, the sliding lever 150 slides on the chassis 80 accordingly, to cause the swingable lever 170 to rock around the shaft 170, so as to transmit the movement of sliding lever 150 to the sliding member 178 for actuating the movement of the sliding member 178 along the stationary shaft 180. A rotating shaft 182 is mounted on the sliding member 178 through a bearing. Consequently, when the sliding member 178 moves along the shaft 180 in response to the movement of the slidable switch button 56, the rotating shaft 182 also moves longitudinally.

The rotating shaft 182 has three frictional wheels 184, 186, and 188 mounted thereon. The frictional wheels 184 and 188 are integrally secured to the shaft 182, but the frictional wheel 186 is rotatable relative to the shaft 182. A compression spring 190 is inserted between the frictional wheels 186 and 188, so as to urge the frictional wheel 186 against the other frictional wheel 184. The function of the compression spring 190 will be described hereinafter. The frictional wheels are selectively brought into contact with reel drive discs 192 and 194 (FIG. 5), so as to selectively drive the reel driving shafts 20 and 22. When the slidable switch button 56 is moved to the uppermost position, as seen in FIG. 2, the frictional wheel 184 comes into contact with the rear side of the reel drive disc 192, so as to rotate the reel drive shaft 22 in a counterclockwise direction, as seen in FIG. 5, for carrying out the rewinding operation. With the slidable switch button 56 at this position, the remaining frictional wheels 186 and 188 are kept away from the reel drive disc 192. When the slidable switch button 56 moves to the intermediate position, the frictional wheel 186 moves into contact with the rear side of the reel drive disc 192, so as to rotate the reel drive shaft 20 in a clockwise direction, as seen in FIG. 5, for feeding the magnetic tape at a speed necessary for recording and reproducing operations in the due direction therefor. Then, as the slidable switch button 56 moves to the lowermost position, as seen in FIG. 5, the frictional wheel 188 moves into contact with the rear side of the reel drive disc 192, so as to rotate the reel drive shaft 20 at a high speed in the due direction for fast-feeding. The frictional wheel 188 is larger than the frictional wheel 186 in diameter, and the diameter of the track or locus of that point of the reel drive disc 192 which moves into contact with the frictional wheel 188 is selected to be smaller than the diameter of the track or locus of that point of the same reel drive disc 192 which moves into contact with the other frictional wheel 186, and hence, when the slidable switch button 56 is at its intermediate position, the reel drive disc 192 and the reel drive shaft 20 rotates at a comparatively low speed, and when the slidable switch button 56 is at its fast-feed position or the lowermost position, the reel drive shaft 20 rotates at a comparatively high speed. During the rewinding and fast-feeding modes of operation, the pinch roller 118 is kept away from the capstan 40, because the magnetic tape need not move at a constant speed. Accordingly, the frictional wheels 184 and 188 are integrally secured to the rotating shaft 182. However, during the recording and reproducing modes of operation, the magnetic tape should move at a constant speed, and hence, the pinch roller 118 is urged against the capstan 40, and the frictional wheel 186 is not integrally secured to the rotating shaft 182 but rotatable relative to the rotating shaft 182. More particularly, the frictional wheel 186 is urged against the adjacent frictional wheel 184 by the spring 190, so that the frictional wheel 186 can rotate with a variable slip relative to the revolving speed of the rotating shaft 182 for effecting a varying revolving speed corresponding to the diameter of the magnetic tape taken up on the tape reel during the recording and reproducing modes of operation.

As described above, the frictional wheels 184, 186, and 188 must be selectively brought into contact with the reel drive discs 192, 194 by operating the slidable switch button 56. In order to facilitate such movement of the frictional wheels, the rotating shaft 182 should be movable not only in the longitudinal direction thereof but also in the lateral direction thereof. For that purpose, a weak compression spring 179 is inserted between the swingable lever 168 and the sliding member 178, so that the bearing portion of the sliding member, which bears the rotating shaft 182, and the rotating shaft 182 itself are slightly biased away from the swingable lever 168. FIG. 6 shows the swingable lever 168 and the rotating shaft 182 located at the record-reproduction position, with a record-reproduction selective switch (not shown) turned to the reproduction side thereof. When the pushbutton 46 for recording is depressed, a pin 63 secured to the lever 72 pushes the tip of a swingable lever 67 upwards, as seen in FIG. 6, so as to turn the swingable lever 67 clockwise around a stationary pin 69 against a spiral spring 79. As a result of this action, a lever 75 (FIG. 5), which will be described hereinafter, moves upwards, as seen in FIG. 5, so that the aforesaid record-reproduction selective switch is turned to the record side thereof.

Referring to FIG. 5, the rotating shaft 182 is slidably mounted to a pulley 196. Due to the fact that the rotating shaft 182 moves longitudinally in response to the movement of the slidable switch button 56, the rotating shaft 182 cannot be integrally secured to the pulley 196. Accordingly, a coiled spring 198 is inserted between the pulley 196 and the rotating shaft 182, with one end thereof connected to the pulley 196 while connecting the opposite end thereof to the rotating shaft 182, so as to transmit the rotation of the pulley 196 to the rotating shaft 182. The pulley 196 is connected to the driving shaft 204 of a motor 202 by an endless belt 200. The motor 202 is swingably supported by a pair of shafts 206, 208 secured to upright brackets issuing from the chassis 80. A coil spring 210 is mounted on the shaft 206, with one end thereof secured to the bracket while engaging the opposite end thereof with a lug 214, so that the left-hand end of the driving shaft 204 is biased toward the back of the paper, as seen in FIG. 5. As long as the pushbutton 48 remains at its raised position, a lever 216 secured to the motor 202 engages the right-hand end of the rotary lever 102, so as to limit the movement of left-hand end of the driving shaft 204 toward the back of the sheet. Upon depression of the pushbutton 48, the rotary lever 102 rotates counterclockwise around the shaft 112, and the right-hand end of the rotary lever 102 moves away from the lever 216 to allow the movement of the left-hand end of the driving shaft 204 of the motor 202 toward the back of the paper. Thus, another frictional wheel 218 secured to the left-hand tip of the driving shaft 204 moves into contact with the peripheral edge of a flywheel 220 (shown by a dash-dot line circle in FIG. 6), so as to rotate the flywheel 220.

The capstan 40 is coaxially secured to the center of the flywheel 220, at right angles to the plane of the flywheel 220, and the capstan 40 is supported, through a ball bearing 222, by a triangular capstan holder 224 (FIG. 6) secured to the chassis 80.

Upon depression of the stop pushbutton 50, the locking mechanism 120, 124 of the pushbutton 48 is released, as described hereinbefore, and the pushbutton 48 returns to its raised position, due to the elasticity of the pulling spring 101. Accordingly, the rotary lever 102 turns clockwise, due to the engagement between the projection 100 formed on the lever 88 and the notch 104 formed at the left-hand end of the rotary lever 102. As a result of it, the right-hand end of the rotary lever 102 moves into engagement with the motor lever 216, to raise the left-hand end of the driving shaft 204 of the motor 202 away from the plane of FIG. 5, against the coil spring 210, so that the frictional wheel 218 is separated from the flywheel 220.

FIG. 5 also shows a cassette receiving plate 14 in dash-dot lines. The cassette receiving plate 14 has, as described above, a pair of shaft holes 24 and 26 to receive the reel drive shafts 20 and 22, three pin holes 34, 36, and 38 to receive the cassette holding pins 28, 30, and 32, a capstan hole 42 to receive the capstan 40, and two other holes to receive shafts 226 and 228 secured to the chassis 80. A coil spring is fitted in each shaft 226 or 228, so as to bias the cassette receiving plate 14 away from the chassis 80. A pair of pins are secured to the cassette receiving plate 14, so that the free ends of the thus secured pins fit in and pass through pin holes 230 and 232 bored on the chassis 80. A coil spring is also mounted on each of the thus secured pins, so as to supplement the bias force for urging the cassette receiving plate 14 away from the chassis 80. The lowered position of the cassette receiving plate 14 is defined by a pad 234 fitted in the pin 30, the head of the pin 76, the head of a shaft 236 to be described, and the top end of a positioning pin 238. When the cassette receiving plate 14 is at such lowered position, the plate 14 is still separated from the reel drive discs 192, 194 with a suitable spacing therebetween, and at the same time, the erasing head 78, the record-reproducing magnetic head 90, the shielding member 92, and the pinch roller 118 can move above the cassette receiving plate 14.

The cassette holding mechanism, for holding both the cassette and the cassette receiving plate 14 at the lowered position thereof, and a cassette knockout mechanism, for releasing the cassette holding mechanism to let the cassette displace out of the tape recorder, will now be described. As described above, the movement of the cassette receiving plate 14 perpendicular to the chassis 80 is guided by the shafts 226, 228 secured to the chassis 80 and a pair of pins secured to the back side of the cassette receiving plate 14 so as to fit in and pass through the pin holes 230, 232 bored on the chassis 80. Coil springs are fitted on the shafts 226, 228, and pins secured to the back side of the cassette receiving plate 14, so as to bias the cassette receiving plate 14 away from the chassis 80. When the cassette is placed in the cassette receiving opening 12 and depressed, the pins 28, 30, 32 penetrate through the corresponding holes bored on the casing of the cassette.

The swingable lever 240 is pivotally secured to the chassis 80 by a stationary shaft 242 (FIG. 6). A boss 244 is formed on the opposite end of the swingable lever 240 with respect to the pin 32. A spring 246 is inserted between the swingable lever 240 and an upright bracket 248 issuing from the chassis 80, with one end of the compression spring 246 engages with the boss 244 formed on the swingable lever 240 while engaging the opposite end thereof with another boss formed on the bracket 248. Thereby, the pin 32 secured to the swingable lever 240 is urged into a notch 250 formed on the chassis 80 by the elasticity of the spring 246. The cassette knockout button 62 is rotatably mounted on the stationary shaft 242. A leaf spring 252 is disposed between the swingable lever 240 and the knockout button 62, by securing it to the swingable lever by a screw 254, so that the knockout button 62 is biased towards the outside of the tape recorder by the leaf spring 252. When the knockout button 62 is depressed, the button 62 rotates around the stationary shaft 252 until the button 62 moves into contact with the swingable lever 240 against the leaf spring 252. The swingable lever 240 is not actuated before the knockout button 62 is brought into contact with the lever 240, and hence, the pin 32 stays in the notch 250. When the knockout button 62 is further depressed, the swingable lever 240 swings around the stationary shaft 242, so that the pin 32 moves out of the notch 250 toward the outside of the tape recorder. That stem portion of each pin 28, 30, or 32, which comes into contact with the surface of holes bored on the casing of the cassette upon placing the cassette in operative position, is chamfered at one side thereof, as depicted by 256, 258, or 259 in FIG. 7. The top end of the pin 28, 30, or 32 is chamfered at one side thereof, as shown by 260, 262, or 264 (FIGS. 5 and 7), so as to facilitate the mounting of the cassette on the tape recorder by the engagement of aforesaid hole bored on the casing of the cassette with such chamfered portion at the beginning of the insertion of the cassette into the opening 12.

When the cassette placed in position on the cassette receiving plate 14 is depressed toward the chassis 80, the chamfered top portions 260, 262, and 264 of the pins 28, 30, and 32 fit in the corresponding holes bored on the casing of the cassette. As the cassette is further depressed, the stem portions of the pin 28, 30, and 32 proceed into the holes, while causing direct contact between the pin surface and the surface of the corresponding cassette hole. As a result of it, the pin 32 is pushed away from the bottom of the notch 250 by swinging the lever 240 against the elasticity of the spring 246, so as to allow the depression of the cassette to the fully lowered operative position thereof. When the cassette is set at the operative position, the chamfered stem portions 256, 258, and 259 of the pins 28, 30, and 32 move into engagement with the edges of the corresponding opening of the casing of the cassette, and the pin 32 is urged toward the pins 28 and 30 by the spring 246 through the swingable lever 240, so as to hold the cassette at the thus operative position.

When the cassette knockout button 62 is depressed, the pin 32 moves away from the pins 28 and 30, or toward the outside of the tape recorder, so as to remove the force urging the cassette against the pins 28 and 30. Thus, the cassette and the cassette receiving plate 14 are displaced away from the chassis 80 by the action of the spring mounted on the shafts 226, 228 and other shafts secured to the back side of the cassette receiving plate 14. Accordingly, the cassette receiving plate 14 moves upward until moving into contact with the upper half 10A of the casing 10, and stops there. On the other hand, the cassette displaces out of the tape recorder through the opening 12 of the upper half 10A of the casing 10 thereof. In order to allow the movement of the pin 32 toward and away from the pins 28 and 30, as described above, the hole 38 (FIG. 1) bored on the cassette receiving plate 14 to allow passage of the pin 32 therethrough is elongated along the direction of the movement of the pin 32.

As shown in FIG. 7, a bracket 268 is secured to the chassis 80 by a screw 266, so that the pulley 196 is pivotally supported by the bracket 268. A printed circuit board 272, constituting the electric circuit of the tape recorder, is mounted on the upper flange portion of the bracket 268 and secured thereto by a screw 270.

Referring to FIG. 6, a projection 274 is formed on the lever 88 secured to the pushbutton 48, which projection 274 extends through a slot 276 bored on the chassis 80. Another swingable lever 278 is pivotally secured to the chassis 80 by a stationary shaft 280 integrally secured to the chassis 80. A spiral spring 282 is wound around the stationary shaft 280, with one end thereof engaged with a bent portion 284 at the right-hand end of the swingable lever 278, while securing the opposite end thereof to a notch 286 formed at the head of the stationary shaft 280, as seen in the figure. The spiral spring 282 is so set as to bias the swingable lever 278 in a counterclockwise direction, as seen in the figure. A pin 288 is secured to the right-hand end of the swingable lever 278, which pin extends to the opposite side of the chassis 80 through a hole 292 formed on the chassis 80 (FIG. 5), and an elastic brake member 290 is secured to the free end of the pin 288. When the pushbuttons 46 and 48 are at the nondepressed positions thereof with the slidable switch button 56 held at the intermediate position, as shown in FIGS. 5 and 6, the elastic brake member 290 is kept in contact with the periphery of the reel drive disc 194 to effect braking action on the reel drive shaft 22.

When the pushbutton 48 for recording and reproducing is depressed; the projection 274 (FIG. 6) formed on the lever 88 secured to the pushbutton 48 moves upward, as seen in FIG. 6, and moves into engagement with the left-hand end of the swingable lever 278 to swing the lever 278 clockwise around the stationary shaft 280 against the spiral spring 282. Thereby, the elastic brake member 290 (FIG. 5) moves away from the periphery of the reel drive disc 194 to release the braking action. The hole 292 should be large enough to allow the aforesaid movement of the elastic brake member 290 and the pin 288 therein.

When the stop pushbutton 50 is depressed, the pushbutton 48 and the lever 88 return to their original nondepressed positions, respectively, so that the swingable lever 278 swings counterclockwise around the stationary shaft 280 by the elasticity of the spiral spring 282. Thus, the elastic brake member 290 resumes its engagement with the periphery of the reel drive disc 194, to apply the braking action on the reel drive shaft 22. By applying such braking action on the tape feeding side reel drive shaft 22, slackening of the tape due to inertia can be prevented.

It will now be described that the aforesaid braking mechanism, including the elastic brake member 290, is also actuatable by the slidable switch button 56. Referring to FIG. 6, a cam plate 294 having a V-notch, as depicted by dotted lines, is secured to the swingable lever 168 by screws 296 and 298 in the proximity of the stationary shaft 170. As described above, the swingable lever 168 has the bifurcated portion 172 engaged with the pin 166 secured to the left-hand end of the slidable lever 150 secured to the slidable button 56, as seen in FIG. 6. A projection 300, shown in dotted lines in FIG. 6, is integrally formed on the left-hand end portion of the swingable lever 278. When the slidable switch button 56 is at its intermediate position, the projection 300 is positioned at the central opening of the V-shape cam plate 294, without causing any operative engagement between the cam plate 294 and the projection 300. Thereby, the elastic brake member 290 mounted on the pin 288 secured to the opposite end of the swingable lever 278 is urged against the periphery of the reel drive disc 194 by the spiral spring 282, provided that the pushbutton 48 is held at the nondepressed position. When the slidable switch button 56 is moved upwards to the rewind position, the swingable lever 168 is turned clockwise, around the stationary shaft 170, as seen in FIG. 6, by the engagement between the bifurcated portion 172 of the lever 168 and pin 166 secured to the lever 150. Thereby, the right-hand arm of the V-groove of the cam plate 294 comes into engagement with the projection 300 and urges the projection 300 leftwards to swing the lever 278 clockwise. Thus, the elastic brake member 290 moves away from the periphery of the reel drive disc 194. On the other hand, when the slidable switch button 56 moves down to the fast-feed position, the swingable lever 168 swings counterclockwise, and the top end of the left-hand arm of the V-groove of the cam plate 294 comes into operative engagement not with the projection 300 but with the lever edge of the left-hand end portion of the swingable lever 278 to push the left-hand end of the lever 278 upward, as seen in FIG. 6. Thereby, the swingable lever 278 rotates clockwise against the spiral spring 282, so as to move the elastic brake member 290 away from the periphery of the reel drive disc 194.

The bent portion 284 formed at the right-hand end of the swingable lever 278, as seen in FIG. 6, also actuates an operating arm 304 of a power switch 302. When the motor is held unactuated, as shown in the figures, the operating arm 304 is urged upward (as shown in FIG. 6) by the bent portion 284 and brought into engagement with the upper electric contact 306. With the operating lever 304 held at such upper position, the motor 202 is not actuated. When the pushbutton 48 is depressed, or when the slidable switch button 56 is moved to the rewind position or to the fast-feed position, the swingable lever 278 swings clockwise, and the operating arm 304 moves away from the upper electric contact 306 and engages a lower electric contact 308 of the power switch 302. With the operating arm held in contact with the electric contact 308, the motor 202 is actuated. That portion of the operating arm 304 of the power switch 302 which engages the bent portion 284 is electrically insulated.

Referring to FIG. 6, the lever 72 secured to the record pushbutton 46 has the pin 63 secured thereto, which extends through the hole 65 bored on the chassis 80. The swingable lever 67 is pivotally secured to the chassis 80 by the stationary shaft 69. The left-hand end (as seen in FIG. 6) of the swingable lever 67 is engageable with the pin 63. The opposite end of the swingable lever 67 is so bent as to extend to the opposite side of the chassis 80 along the edge thereof, and the lever 75 is secured to the thus extended portion of the swingable lever 67 by a pair of fastening screws 71 and 73. The lever 75 acts to switch over electric contacts of a record-reproduction selecting switch. A pin 77 is secured to the chassis 80 at the steplike bent portion thereof, and a spiral spring 79 is mounted thereon, as shown in FIG. 6. One end of the spiral 79 engages the lever 75, as depicted in FIG. 5, while the opposite end of the spiral spring 79 is secured to the chassis 80, as shown in FIG. 6. The elastic properties of the spring 79 is such that the lever 67 is biased counterclockwise (as seen in FIG. 6) around the stationary shaft 69, by the spiral spring 79. When the pushbuttons 46 and 48 are depressed simultaneously, the pin 63 integrally formed on the lever 72 connected to the pushbutton 46 swings the swingable lever 67 clockwise around the stationary shaft 69 against the spiral spring 79, so that the record-reproduction selecting switch is turned to the record side.

As described above, a weak compression spring 179 is inserted between the swingable lever 168 and the sliding member 178, so as to urge the sliding member 178 toward the chassis 80 around the stationary shaft 180, as shown in FIG. 6. Thus, the frictional wheels 184, 186, 188 are selectively urged against the back side of the reel drive discs 192, 194, by the elasticity of the compression spring 179.

As described in the foregoing, with the miniature tape recorder according to the present invention, all the operative members of the tape recorder can be reliably and accurately actuated without any failure, while holding the entire tape recorder by one hand, and more particularly such accurate and reliable operation of the tape recorder can be easily carried out by touch without necessity for seeing the operative members.

A safety means usable in the tape recorder, according to the present invention, will now be described, with referring to FIGS. 8 to 9*d*. A pin 330 is secured to the slidable lever 150 integrally secured to the slidable switch button 56, so as to extend through a slot 332 formed on the chassis 80. The slot 332 extends in the same direction as the slot 152 formed on the sliding lever 150. The slidable switch button 56 of this particular embodiment of the present invention assumes three operative positions: namely, a first portion, or the extreme right position, as seen in FIG. 8, for effecting rewinding of magnetic tape; a second position, or the extreme left position, as seen in the figure, for effecting fast-feeding of the magnetic tape; and a third position, or the intermediate position between the first and second position, for effecting magnetic tape feeding for recording and reproducing mode of operation.

A projection 334 is secured to the lever 88 integrally secured to the record-reproduction pushbutton 48, which projection extends through a slot 335 formed on the chassis 80 and fits in the slot 152 formed on the slidable lever 152 secured to the slidable button 56. The slot 335 extends in the direction in which the projection 334 moves, i.e. the direction of the movement of the pushbutton 48 upon depression thereof.

When the slidable switch button 56 is at the third operative position, or the intermediate position, the aforesaid projection 334 is engageable with a notch 336 formed on the sliding lever 150 so as to be communicated with the slot 152, which notch extends at right angles to the direction of movement of the slidable button 56. In other words, the notch 336 extends in the direction of the movement of the pushbutton 48. The width of the notch 336 is slightly wider than that of the projection 334, and the length of the notch 336 is slightly longer than the stroke of the movement of the record-reproduction pushbutton 48. The slot 335 extends in the same direction as that of the notch 336. Accordingly, when the slidable switch button 56 is at its third position, or at its intermediate position, the projection 334 of the record-reproduction pushbutton 48 is engageable with the slot 336, as shown in FIG. 9*a*, and as the record-reproduction pushbutton 48 is depressed, the projection 334 proceeds along the notch 336, as illustrated in FIG. 9*b*. Thus, with the slidable switch button held at its third position, the reproducing or recording mode of operation can be carried out by depressing the pushbutton 48 or by simultaneously depressing the pushbuttons 46 and 48.

Figures 9A, 9B, 9C, 9D:
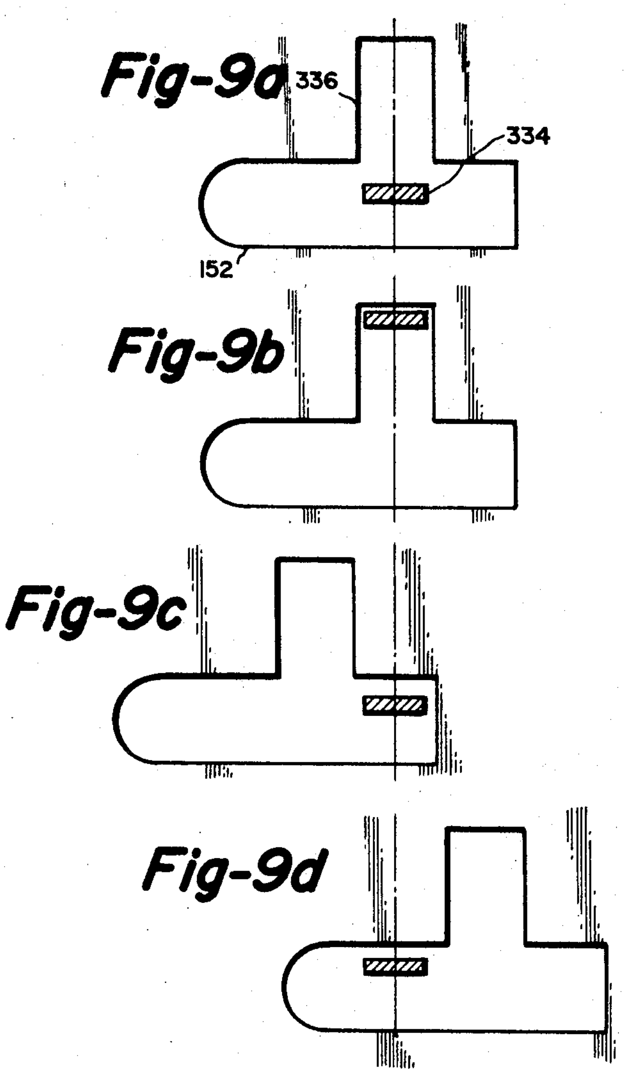

When the slidable switch button 56 is at its first or second position, the projection 334 of the pushbutton 48 is located opposite to the nonnotched edge portion of the slot 152 of the sliding lever 150, as shown in FIG. 9*c* or FIG. 9*d*, respectively. Accordingly, when an operator tries to depress the pushbutton 48, the movement of the pushbutton 48 is hampered by the engagement of the projection 334 thereof and the nonnotched edge portion of the slot 152. Thus, the depression of the record-reproduction pushbutton 48 is prevented during the fast-feeding and rewinding mode of operation.

On the other hand, when the tape recorder is in the recording or reproducing mode of operation, the projection 334 of the pushbutton 48 fits in the notch 336 of the slot 152 of the sliding lever 150, as shown in FIG. 9*b*. Accordingly, the movement of the sliding switch button 56 either rightward or leftward, as seen in FIG. 8, is hampered by the engagement of the projection 334 with the side edge of the notch 336. Accordingly, when the tape recorder is in the recording or reproducing mode of operation, the rewinding and fast-feeding of magnetic tape is prevented.

As described above, the safety means usable in the tape recorder, according to the present invention, is very simple in construction and occupies little space, and hence, the safety means is particularly suitable for a miniature tape recorder. With such safety means, malfunction of the tape recorder can be effectively prevented; namely, during fast-feeding and rewinding of the magnetic tape, neither the recording nor reproducing operation is possible, while during recording and reproducing operations, neither rewinding nor fast-feeding of the magnetic tape is possible. Therefore, the miniature tape recorder can be accurately and reliably operated by touch without necessity for seeing it, and for instance the miniature tape recorder held in a pocket can be accurately and reliably operated without removing it from the pocket.

In the miniature tape recorder of the aforesaid construction, when the record-reproduction pushbutton 48 is depressed, the record-reproduction magnetic head 90 mounted on the lever 88 integrally secured to the pushbutton 48 moves toward the magnetic tape mounted in the cassette, and at the same time the pinch roller 118 is urged toward the capstan 40 with the magnetic tape movably inserted therebetween. If the record-reproduction pushbutton 48 is depressed during the cassette is being mounted on the tape recorder or when the cassette is improperly mounted on the tape recorder, the pinch roller 118 tends to move into contact with the cassette receiving plate 14, resulting in a damage on the pinch roller. Since the pinch roller 118 is mounted on the free end of the rotary lever 102, which is pivotally supported by the shaft 112 and biased by the spring 110 inserted between the pushbutton 48 and the free end of the rotary lever 102, as described hereinbefore, referring to FIGS. 5 to 7, if the pushbutton 48 is depressed when the cassette receiving plate 14 is at an intermediate position between the raised and lowered positions, the pinch roller 118 moves into contact with the edge of the cassette receiving plate 14 at first, and then the magnetic head 90 moves into contact with the cassette receiving plate 14 upon further depression of the pushbutton 48. In other words, not only the pinch roller 118, but also the magnetic head 90 is subjected to possible damage, under such conditions.

The preferred embodiment of the miniature tape recorder, according to the present invention, can include another safety means to obviate the aforesaid difficulty, which is very simple in construction yet capable of allowing the depression of the record-reproduction pushbutton 48 only when the cassette is properly mounted on the tape recorder, so as to inhibit the movement of the record-reproduction pushbutton 48 both when the cassette is improperly mounted on the tape recorder and during the cassette is being mounted. Such safety means usable in the miniature tape recorder according to the present invention is characterized in that a nose is integrally formed on the lever connected to the record-reproduction pushbutton, as an extension thereof, which lever is adapted to urge the magnetic head and the pinch roller, and that a stopper lug vertically issues from the lower surface of the cassette receiving plate at a position engageable with said nose connected to said lever secured to the record-reproduction pushbutton, so as to prevent the depression of the record-reproduction pushbutton by the engagement of the nose and the stopper lug, said stopper lug having a pair of notches adapted to form passages of said nose through the stopper lug only when the cassette receiving plate is at its fully raised position and at its fully lowered position with the cassette mounted properly on the tape recorder.

The aforesaid safety means related to the cassette will now be described in detail referring to FIGS. 10 to 11*b*. The nose 340 is integrally formed on the lever 88 as an extension thereof, which lever is secured to the record-reproduction pushbutton 48. A stopper lug 342 issues downwards from the back side of the cassette receiving plate 14 at a position engageable with the nose 340 of the lever 88, as seen in FIG. 10. The chassis 80 has a hole 344 bored thereon so as to allow passage of the stopper lug 342 therethrough upon depression of the cassette receiving plate 14 for mounting the cassette on the tape recorder. A pair of notches 346 and 348 are formed at the upper end and at the lower end of the stopper lug 342, respectively. When there is no cassette mounted on the tape recorder, the cassette receiving plate 14 is held at the fully raised position by compression springs 350, 352, 354, and 356, and at this moment, the lower notch 348 of the stopper lug 342 is positioned on the prospective passage of the nose 340 formed on the lever 88, so as to allow the depression of the record-reproduction pushbutton 48. Similarly, when a cassette is properly mounted on the tape recorder, the cassette receiving plate 14 is at the fully lowered position against the compression springs 350 to 356, so that the upper notch 346 of the stopper lug 342 is positioned on the prospective passage of the nose 340 formed on the lever 88, so as to allow the depression of the record-reproduction pushbutton 48. It is apparent that the notches 346 and 348 should be large enough to allow free passage of the nose 340 therethrough upon depression of the record-reproduction pushbutton 48.

FIG. 11*a* shows the position of the stopper lug 342 relative to the nose 340 when there is no cassette mounted on the tape recorder, where the nose 340 is insertable in the lower notch 348 of the stopper lug 342, so as to allow the depression of the record-reproduction pushbutton 48. FIG. 11*b* shows the position of the stopper lug 342 relative to the nose 340 when the cassette is properly mounted on the tape recorder by depressing the cassette receiving plate 14 to its fully lowered position, where the nose 340 is insertable in the upper notch 346 of the stopper lug 342, so as to allow the depression of the record-reproduction pushbutton 48.

On the other hand, when the cassette receiving plate 14 is at an intermediate position between the fully raised position, as shown in FIG. 11*a*, and the fully lowered position, as shown in FIG. 11*b*, the tip of the nose 340 strikes the stopper lug 342. If the operator tries to depress the record-reproduction pushbutton 48 under such conditions, the movement of the pushbutton 48 is hampered by the engagement of the nose 340 of the lever 88 secured to the pushbutton 48 with the stopper lug 342. Thus, the record-reproduction pushbutton 48 cannot be depressed.

Accordingly, the pinch roller 118 and the magnetic head 90 can be protected by the safety means of the aforesaid construction, which is very simple and mountable within a very limited space. In other words, the safety means of the aforesaid construction is particularly suitable for the miniature tape recorder, according to the present invention.

The detailed construction of the safety means is not limited to that illustrated in the figures, but many modifications are possible within the scope of the invention. For instance, the nose 340 can be a bar integrally connected to the lever 88, and the notches 346 and 348 can be circular holes bored on the stopper lug at the corresponding locations, so as to allow the passage of the bar therethrough.

In the embodiment of the miniature tape recorder, according to the present invention, described hereinbefore referring to FIGS. 1 to 11*b*, a cassette knockout button 62 is provided, and the cassette can be forced out of the tape recorder together with the cassette receiving plate 14 by depressing the knockout button 62 for moving the cassette holding pin 32 mounted on the lever 240 pivotally secured to the chassis of the tape recorder. If such cassette knockout button is depressed while the tape is being rewound or fed fast, there is a danger of damaging the tape. As pointed out in the foregoing, the miniature tape recorder, according to the present invention, may be operated by touch without necessity for seeing it, while keeping it in a pocket, and hence, there is a danger that the operator may depress, by mistake, the knockout button 62 during the rewinding or fast-feeding mode of operation.

FIGS. 12 and 13 illustrate a safety means for preventing such malfunction, which safety means prevents the depression of the cassette knockout button 62 for releasing the cassette, during the rewinding and fast-feeding mode of operation. The safety means is characterized in that a sliding member is interconnected to a slidable switch button adapted to assume a first position for rewind, a second position for fast-feeding, and a third position for recording-reproducing, that a projection is formed on that portion of the knockout button for releasing a cassette releasing mechanism which faces said sliding member, and that a notch is formed on the sliding member so as to allow the thrusting of the projection of the knockout button into said notch when said slidable switch button is at said third position.

Referring to the figures, the movement of the slidable switch button 56 is transmitted to the sliding member 178 through the swingable lever 168 pivotally secured to the chassis 80 (FIG. 6) by the stationary shaft 170. When the slidable switch button 56 moves rightward to its first position, as seen in FIG. 12, the sliding member 178 moves leftward. On the contrary, when the slidable switch lever 56 moves leftward to its second position, as seen in FIG. 12, the sliding member 178 moves rightward. Accordingly, when the slidable switch lever 56 is at its third position or the intermediate position, the sliding member is also held at the intermediate position thereof. The knockout pushbutton 62 has a projection 362 formed on that side thereof which faces the sliding member 178. A notch 360 is formed on that portion of the sliding member 178 which faces the projection 362 when the sliding member 178 is at its intermediate position, corresponding to the third position of the slidable switch button 56, so that the projection 362 can thrust into the notch 360 as long as the slidable switch button 56 is held at its third position.

Accordingly, when the sliding member 178 is at its intermediate position, the cassette knockout button 62 can be depressed, to move the pin 32 toward the outside of the tape recorder, for releasing the cassette locking mechanism to cause the cassette to jump out of the tape recorder. FIG. 13 shows the sliding member 178 held at the intermediate position, together with the knockout button 62 engageable with the sliding member 178. When the slidable switch button 56 moves to the rewind, or fast-feed position, the sliding member 178 moves to the left of the intermediate position as shown in FIG. 13, or to the right thereof, respectively, as depicted by arrows REW and FF in FIG. 13. Thus, when the operator tries to depress the knockout button 62 with the slidable switch button 56 held at its first or second position, the projection 362 of the cassette knockout button 62 strikes the nonnotch side portions of the sliding member 178, and hence, the knockout button 62 cannot be depressed.

Accordingly, with the safety means of FIGS. 12 and 13, the depression of the knockout button 62 and the accompanying displacement of the cassette can be prevented during the rewinding and fast-feeding mode of operation of the tape recorder, by means of very simple construction.

Furthermore, if the cassette knockout button 62 is depressed when the tape recorder is under recording or reproducing mode of operation, the cassette released from the cassette locking mechanism causes serious damage on the tape, and sometimes cuts the tape. If the cassette moves slightly, the contact between the head and the tape and the travelling of the tape are influenced so as to reduce the tone quality. As pointed out in the foregoing the miniature tape recorder, according to the present invention, may be operated by touch without necessity for seeing it, while keeping it in a pocket, and hence, there is a danger that the operator may depress, by mistake, the knockout button 62 during the recording or reproducing mode of operation.

FIGS. 14 to 15*b* illustrate a safety means for preventing such malfunction, mounted on the tape recorder illustrated in FIGS. 1 to 13, which safety means prevents the depression of the cassette knockout button 62 for releasing the cassette during the recording or reproducing mode of operation as well as the slight movement of the cassette. The safety means is characterized in that the lever secured to the record-reproduction pushbutton has an extended lug, that a slidable piece having a pin and a cam surface is mounted on the chassis so as to be slidable in a direction perpendicular to the direction of the movement of the record-reproduction pushbutton, said slidable piece being biased toward a nonactivated position by a spring inserted between said slidable piece and the chassis and movable to an actuated position upon depression of the record-reproduction pushbutton by the engagement between said cam surface of the slidable piece and said extended lug of said lever, and that a projection is formed on the cassette knockout button which projection is engageable with said pin of the slidable piece when said slidable piece is at said actuated position so as to prevent the depression of said knockout button, while not being engageable with said pin of the slidable piece when said slidable piece is at the nonactuated position.

In the figures, an extended lug 370 is formed at one end of the lever 88 integrally secured to the record-reproduction pushbutton 48, which lever 88 has a magnetic head 90 mounted thereon. A slidable piece 372 is slidably mounted on the chassis 80, and a cam portion or an inclined edge 374 is formed on that portion of the slidable piece 372 which is engageable with the extended lug 370 of the lever 88. Slots 376 and 378 are bored on the opposite longitudinal ends of the slidable piece 372, and stationary pins 380 and 382, secured to the chassis 80, extend through the slots 376 and 378, respectively. Thereby, the slidable piece is guided to move at right angles with the direction of movement of the knockout button 62. A stopper pin 384 is integrally secured to the slidable piece 372 and extends through a chassis 80. A projection 386 is formed on the swingable lever 240 cooperating with the cassette knockout button 62, and a pulling spring 388 is inserted between the projections 386 and the stopper pin 384. When the record-reproduction pushbutton 48 is at its raised position, the slidable piece 372 remains at its nonactuated position, or held at the left-hand side position by the spring 388, as seen in FIG. 14. As the pushbutton 48 is depressed from such position, the tip of the extended lug 370 moves into engagement with the inclined edge 374 of the slidable piece 372. When the pushbutton 48 is further depressed, the extended lug 370 forces the slidable piece 372 rightward against the spring 388, as seen in FIG. 14, by the engagement between the tip of the extended lug 370 and the inclined edge 374 of the slidable piece 372. Thus, the stopper pin 384 also moves rightward. A projection 390 is formed on that portion of the knockout button 62 where the stopper pin moves into engagement with the projection 390 thus formed as the slidable piece 372 moves rightward in the figure. The width of the projection 390 is such that when the slidable piece 372 returns to its original left-hand position by the elasticity of the spring 388, upon depression of the stop button 50 followed by the rising of the record-reproduction pushbutton 48, the stopper pin 384 moves out of the locus of the projection 390, so that the cassette knockout button 62 can be depressed toward the inside of the tape recorder.

FIG. 15*a* shows the position of the stopper pin 384 relative to the knockout button 62, for the case when the record-reproduction pushbutton 48 is not depressed. Under such conditions, the stopper pin 384 is deviated from the locus of the movement of the projection 390 formed on the knockout button 62. Accordingly, the knockout button 62 can be depressed, so as to turn the swingable lever 240 around the stationary shaft 242 for moving the pin 32 toward the outside of the tape recorder. Thereby, the cassette holding mechanism is released. FIG. 15*b* shows the position of the stopper pin 384 relative to the knockout button 62, for the case when the record-reproduction pushbutton 48 is depressed for effecting the recording or reproducing operation. With the pushbutton 48 thus depressed, the stopper pin 384 secured to the slidable piece 372 becomes engageable with the projection 390 formed on the knockout button 62, and hence, even if the knockout button 62 is depressed, the projection 390 strikes the stopper pin 384 and the knockout button 62 cannot be depressed any effective extent.

Thus, with the safety means of the aforesaid construction, the depression of the cassette knockout button 62 and the accompanying displacement of the cassette, during the recording or reproducing mode of operation, can be prevented, especially by means of very simple mechanism.

In order to achieve satisfactory acoustic characteristics of the tape recorder, it is necessary to reduce the electric noise produced by the commutators and brushes of a DC micromotor, and hence, miniature tape recorder, according to the present invention, includes a special means for reducing such electric noise.

FIG. 16 shows a known method for reducing the electric noise caused by the operation of a DC motor, in which a filter circuit including choke coils L and a capacitor C is inserted between the motor M and a power source circuit S by lead wires. In miniaturizing the tape recorder, the DC micromotor has to be positioned close to the reproducing amplifier of the tape recorder. Accordingly, the filter circuit, such as shown in FIG. 16, should be located as close to the DC micromotor as possible. If the filter circuit is spaced remote from the DC motor, the lead wire between the motor and the filter becomes too long and may sometimes pass the proximity of the filter, or choke coil itself may be positioned close to the amplifier, so that the effect of the filter circuit is diminished and the electric noise increases. Thus, the selection of the position of the choke coil in the tape recorder is a very important factor.

Moreover, if the choke coil is disposed inside the tape recorder, it occupies a considerably large space and hampers the effective miniaturization of the tape recorder.

In order to obviate the aforesaid difficulties of known filter circuit, the present invention intends to provide a special means for damping the electric noise caused by a DC motor, which does not use a choke coil and occupies substantially no additional space in the tape recorder.

The special noise damping means will now be described in detail, referring to FIGS. 17 and 18. A choke coil was inserted between a pair of lead wires, a positive side and a negative side lead wires, connecting a DC micromotor to a power source, and the length of the choke coil was varied, while measuring the level of the electric noise from the DC motor for different length of the choke coil. The result is shown in FIG. 17. In other words, as the length of the choke coil connected to the DC motor increases, the electric noise diminishes rapidly in the beginning and then gradually, while somewhat depending on the type of motor and the nature of the electric noise. It was noticed that the damping effect of the electric noise by such choke coil is mainly related to the length of the coil winding, not so much to the number of turns and the manner of winding the choke coil. Thus, the inventor has noticed the fact that the electric noise caused by the DC micromotor can be effectively damped to a harmless level by using a winding, more particularly, if a DC micromotor is actuated through a sufficiently long winding with an allowable DC resistance, then the electric noise from the DC micromotor can be greatly damped.

With regard to the position of such winding, inside the tape recorder, according to the present invention, it is mounted inside a shielding case covering the DC micromotor for preventing the propagation of the magnetic noise therefrom. If the winding should be disposed in the proximity of the amplifier circuit or the input circuit to the amplifier, the winding can cause an increase in the electric noise. The location of the winding is critical in the present invention.

In FIG. 18, a winding 480 is wound on the peripheral surface of a DC micromotor 202, and then a shield case 482 is mounted on the motor 202 so as to cover the motor.

By disposing the winding 480 between the motor 202 and the shield case 482 therefor, as depicted in FIG. 18, the propagation of the electric noise from the winding 480 to the amplifier input circuit is effectively prevented by the shield case 482. Moreover, in the lead wires 484 extending from the shield case 482 to the power source 486, the electric noise is already damped to a harmless level, and hence, such lead wires 484 cannot cause any increase of electric noise, even if they come close to the amplifier input circuit of the tape recorder.

The DC resistance of the winding 480 can be minimized by using the thickest wire for the winding, which is allowable in the space between the DC micromotor 202 and the shield case 482.

In the preferred embodiment of the invention, the winding 480 is formed by winding the lead wires 484 directly on the peripheral surface of the DC micromotor 202, before the lead wires 484 are connected to the motor terminals.

As described in the foregoing, according to the present invention, by disposing an elongated winding 480 in the space between a DC micromotor and a shield case 482, the electric noise from the DC micromotor can be effectively damped without sacrificing any space within the tape recorder. The DC resistance of the winding 480 can be easily made small. Moreover, the noise damping means of the present invention can be manufactured with ease at a low cost.

We claim:

1. A pocket size tape recorder comprising: a flat elongated casing capable of being held in one hand of an operator; a chassis including opposite faces mounted in the casing; a slidable switch button extending from a longitudinal sidewall of the casing and mounted on one face of the chassis so as to move in a longitudinal direction of the casing, said slidable switch button being supported for selectively assuming a recording-reproducing position, a fast-feeding position, and a rewinding position; a record-reproduction pushbutton extending from the sidewall of the casing and mounted on the opposite face of the chassis so as to be movable at right angles to the longitudinal direction of the casing, said record-reproducing pushbutton including a recording-reproduction magnetic head and a lever both integrally secured thereto; and a lever plate secured to the slidable switch button and having a T-shaped slot including an axially extending straight portion and a perpendicularly extending notch, said lever having a projection slidably fitted in said T-shaped slot of the lever plate in such a manner that only when the slidable switch button is at the recording-reproducing position, the record-reproduction pushbutton can be depressed while causing said projection to move along said perpendicular notch, for bringing the recording-reproducing head in operative contact with a magnetic tape for recording and reproducing sound signals thereon.

2. A pocket-size tape recorder comprising: a flat elongated casing capable of being held in one hand of an operator; a chassis mounted in the casing; a record-reproduction pushbutton mounted on a sidewall of the casing so as to be movable at right angles to the longitudinal direction of the casing, the pushbutton including a recording-reproducing magnetic head and a lever both integrally secured thereto; a cassette receiving plate movable between a raised position away from said chassis and lowered position, depending on whether a cassette is absent or present in the tape recorder, respectively; a spring means inserted between said cassette receiving plate and said chassis to bias the cassette receiving plate toward the raised position; a nose formed on said lever of the pushbutton; and a stopper lug issuing downwards from the lower surface of the cassette receiving plate at a position engageable with said nose in such a manner that the depression of the record-reproduction pushbutton is prevented by the engagement of the nose and the stopper lug and permitted when the cassette receiving plate is at said raised position and at said lowered position with the cassette mounted properly on the tape recorder.

3. A pocket-size size tape recorder comprising: a flat elongated casing capable of being held in one hand of an operator; a chassis mounted on the sidewall of the casing at one side of the chassis so as to be movable at right angles to the axial direction of the casing, the pushbutton including a recording-reproducing magnetic head and a lever both integrally secured thereto; a cassette receiving plate movable between a raised position away from said chassis and a lowered position, depending on whether a cassette is absent or present in the tape recorder, respectively; a spring means inserted between said cassette receiving plate and said chassis for biasing said cassette receiving plate toward the raised position; a swingable lever pivotally secured to the chassis and having a notch engageable with said cassette receiving plate when the plate is at said lowered position against the elasticity of said spring, the swingable lever being resiliently biased in such a direction as to keep said notch in engagement with the chassis receiving plate; a cassette knockout button secured to said swingable lever and actuatable from the outside of the casing for turning the swingable lever against said resilient bias force, so as to disengage said notch from said cassette receiving plate for causing the cassette receiving plate to displace away from said lowered position by the elasticity of said spring; a lug formed at one end of said lever of the record-reproduction pushbutton; a slidable piece including a pin and a cam surface and mounted on the chassis so as to be slidable in a direction perpendicular to the direction of the movement of said record-reproducing pushbutton, said slidable piece being biased toward a nonactuated position by a spring inserted between said slidable piece and the chassis and movable to an actuated position upon depression of said record-reproduction pushbutton by the engagement between said cam surface of said slidable piece and said lug of said lever; and a projection included on the cassette knockout button which projection is engageable with said pin of the slidable piece when said slidable piece is at said actuated position so as to prevent the depression of said knockout button, and being unengageable with said pin of the slidable piece when said slidable piece is at said nonactuated position.

4. A pocket-size tape recorder comprising: a flat elongated casing capable of being held in one hand of an operator; a chassis mounted in the casing; a cassette receiving plate movable between a raised position away from said chassis an a lowered position, depending on whether a cassette is absent or present in the tape recorder, respectively; a spring means inserted between said cassette receiving plate and said chassis to bias the cassette receiving plate toward the raised position; a swingable lever pivotally secured to the chassis and having a notch engageable with said cassette receiving plate when the plate is at said lowered position, the swingable lever being resiliently biased in such a direction as to keep said notch in engagement with the chassis receiving plate; a cassette knockout button secured to said swingable lever an being actuatable from the outside of the casing for turning the swingable lever against said resilient bias force, so as to disengage said notch from the cassette receiving plate for causing the cassette receiving plate to displace away from said lowered position by the elasticity of said spring; a slidable switch button mounted on a sidewall of the casing so as to be movable in a longitudinal direction of the casing, said switch button having a projection and selectively assuming a recording-reproducing position, a fast-feeding position, and a rewinding position; a sliding member slidably mounted on the chassis and having a notch; a lug integrally formed with said cassette knockout button, the lug being engageable with said notch of the sliding member; a projection integrally formed with said swingable lever; and an interlink lever pivotally secured to the chassis, one end of the interlink lever operatively engaging said projection of the slidable switch button and the opposite end of the interlink lever operatively engaging said projection of the swingable lever, such that the interlink lever causes said slidable switch button to occupy alternately three different positions corresponding to said rewinding position, recording-reproducing position, and fast-feeding position of said slidable switch button, wherein said notch of the sliding member receives said lug of the cassette knockout button for allowing the depression of said knockout button only when said slidable switch button is at said recording-reproducing position.

5. A pocket-size tape recorder according to claim 4 and further comprising; a driving means including a motor swingably mounted on the chassis, a flywheel pivotally mounted on the chassis, a capstan coaxially secured to the flywheel, a rotary shaft driven by the motor through a pulley and having three frictional wheels mounted thereon, and reel drive discs having reel drive shafts and selectively engageable with one of said three frictional wheels; a pinch roller movably mounted on the chassis so as to drivingly hold the magnetic tape between the pinch roller and the capstan upon actuation of the tape recorder; and a stop pushbutton secured to a stop lever slidable on the chassis, said stop lever being operatively connected to the motor in such a manner that, upon depression of said stop pushbutton, the stop lever swings back said motor to disengage said drive shaft from said flywheel and remove said pinch roller from said capstan.

6. A pocket-size tape recorder according to claim 5 wherein said motor is a DC miniature motor including power feeding lead wires, which are wound on the outer peripheral surface thereof, and a shield case mounted on the motor so as to cover said lead wires wound on the motor.